US008012555B2

(12) United States Patent
Zumbrum

(10) Patent No.: US 8,012,555 B2
(45) Date of Patent: Sep. 6, 2011

(54) FLUOROPLASTIC COMPOSITE ELASTOMER

(75) Inventor: Michael Allen Zumbrum, Rising Sun, MD (US)

(73) Assignee: Maztech, Inc., Rising Sun, MD (US)

( * ) Notice: Subject to any disclaimer, the term of this patent is extended or adjusted under 35 U.S.C. 154(b) by 543 days.

(21) Appl. No.: 11/182,821

(22) Filed: Jul. 18, 2005

(65) Prior Publication Data

US 2006/0018777 A1 Jan. 26, 2006

Related U.S. Application Data

(60) Provisional application No. 60/590,290, filed on Jul. 21, 2004.

(51) Int. Cl.

| | |
|---|---|
| ***B32B 25/08*** | (2006.01) |
| ***B32B 25/14*** | (2006.01) |
| ***B32B 27/08*** | (2006.01) |
| ***B32B 27/28*** | (2006.01) |
| ***B32B 27/30*** | (2006.01) |

(52) U.S. Cl. ..................... 428/36.8; 428/34.1; 428/35.7; 428/36.6; 428/36.9; 428/36.91; 428/212; 428/213; 428/215; 428/421; 428/422; 428/492; 428/515; 428/516; 428/517; 428/519; 428/520; 428/521; 428/522; 417/474; 417/477.12; 417/477.13

(58) Field of Classification Search ........................ None
See application file for complete search history.

(56) References Cited

U.S. PATENT DOCUMENTS

| | | | | |
|---|---|---|---|---|
| 5,954,371 | A * | 9/1999 | Koke et al. | 285/55 |
| 5,972,441 | A * | 10/1999 | Campbell et al. | 428/34.1 |
| 6,016,848 | A * | 1/2000 | Egres, Jr. | 138/137 |
| 6,027,779 | A * | 2/2000 | Campbell et al. | 428/36.91 |
| 6,451,396 | B1 * | 9/2002 | Zumbrum et al. | 428/36.91 |
| 6,673,455 | B2 * | 1/2004 | Zumbrum et al. | 428/421 |
| 2003/0012905 | A1 * | 1/2003 | Zumbrum et al. | 428/36.4 |
| 2003/0211264 | A1 * | 11/2003 | Farnsworth et al. | 428/36.9 |

FOREIGN PATENT DOCUMENTS

WO WO 99/41071 * 8/1999

* cited by examiner

*Primary Examiner* — Vivian Chen
(74) *Attorney, Agent, or Firm* — Womble Carlyle Sandridge & Rice, PLLC

(57) ABSTRACT

An improved fluoroplastic lined elastomeric tube that can maintain a stable flow rate while pumping aggressive chemicals in a peristaltic pump for an extended period of time and is fabricated in sizes ranging from 0.5 mm to 100 mm in inside diameter. The inner fluoroplastic liner comprises a composite of expanded polytetrafluoroethylene and a fluoroplastic polymer resulting in improved flex life over single component fluoroplastics. The inventive liner is bonded to either an unreinforced elastomer or a fiber reinforced elastomer for use in both low and high pressure peristaltic pump applications.

13 Claims, 3 Drawing Sheets

FLUOROPLASTIC COMPOSITE ELASTOMER

This application claims benefit of provisional application No. 60/590,290 filed Jul. 21, 2004.

FIELD OF THE INVENTION

The present invention is directed to a durable fluoroplastic composite elastomer.

BACKGROUND OF THE INVENTION

Peristaltic pumps are used in numerous applications that require low shear pumping, portability, ability to run dry, ease of cleaning, accurate dosing, etc. These applications can be found in industries ranging from pharmaceutical manufacturing to food processing to water treatment.

The basic principle of peristaltic pumping involves the rotation of a central rotor containing either rollers or fixed shoes against a resilient elastomeric tube surrounding the rotor that is compliant enough to allow for complete collapse from the rotating rollers, and yet elastic enough to recover to a circular cross-section (referred to as restitution) once the rollers pass, thus enabling the next segment of tubing to fill with the process fluid and maintain flow. Thus, the tubing must withstand repeated flexure in contact with the process fluid.

There are two main types of peristaltic pumps: tubing pumps and hose pumps. Tubing pumps typically contain rollers to compress small diameter tubes ranging in size from 0.5 m to 25 mm inside diameter. Tubing pumps are manufactured by several companies including Watson-Marlow Bredel, Ltd. (Falmouth, England), Ismatec SA (Glattbrugg, Switzerland), and the Barnant Company (Barrington, Ill.). Hose pumps typically contain fixed shoes attached to the rotor which are used to compress large diameter hoses that may contain reinforcing cords in the side wall and range in size from 10 mm to 100 mm in inside diameter. Hose pumps are manufactured by several companies including Bredel Hose Pumps BV (Delden, The Netherlands), Verder Deutschland GmbH (Haan, Germany), and Allweiler AG (Radolfzell, Germany).

One unique capability of peristaltic pumps is that shear sensitive products can be conveyed with either little or no damage to the product. For example, live fish and whole fruit have been pumped without degradation. In general, fluids containing suspended material, either fine or coarse, can be readily processed with peristaltic pumps. Centrifugal pumps, on the other hand, often have problems with damaging both the process product and the internal workings of the pump. Peristaltic pumps can also be run dry without the concern of destroying the pump. Other pump types, such as progressive cavity pumps and centrifugal pumps, are quickly damaged by operating without a fluid in the pumping chamber since they rely on the process fluid for lubrication.

Another advantage of peristaltic pumps is their relatively simple method of operation. This feature means that peristaltic pumps can be easily cleaned with the removal of the flexible tubing which is the only portion of the pump containing the process fluid. Once the tube is removed, the pump is ready for service with a different material. Centrifugal pumps, on the other hand, are difficult to clean completely due to the many crevices in the pumping chamber. In the case of air operated diaphragm pumps, the pump must be disassembled, have the diaphragms removed, and cleaned throughout the internal chamber in order to reduce cross-contamination. The cleaning costs associated with centrifugal, air operated diaphragm, and progressive cavity pumps are significant and lead to considerable down-time.

Another advantage of peristaltic pumps is that they can readily accept a wide range of tubing materials for various applications with non-aggressive fluids. Tubing materials commonly used in peristaltic pumping include silicone rubber, polyvinyl chloride (PVC) sold under the trademark of Tygon by Saint-Gobain Performance Plastics, Inc. (Akron, Ohio), ethylene-propylene-diene monomer rubber blended with polypropylene sold under the trademark of Marprene by Watson-Marlow Bredel, Ltd. and by Advanced Elastomer Systems, L.P. (Akron, Ohio) under the trademark of Santoprene, polyisoprene, natural rubber, polychloroprene, polyurethanes, and blends of elastomers. Thus, for example, applications requiring long life and low operating cost may choose a thermoplastic elastomer tubing. Applications requiring high purity and stable flow rates may choose silicone tubing. As a result, the end user can accommodate the process fluid by judiciously selecting the proper tubing material that is compatible with their particular fluid.

Unlike tubing, hose construction typically involves a layer of pure elastomer such as natural rubber, covered by layers of either tire cords or reinforcing yarns, and covered further by a layer of abrasion resistant butadiene mixed with natural rubber, as described by Boast (EP 325 470 B1). The reinforcing filaments in hoses allow hose pumps to operate at higher back pressures compared to tubing pumps.

Although peristaltic pumps have many advantages, they do suffer from some drawbacks. In particular, pump tube materials are typically not compatible with aggressive chemicals. Process streams containing solvents tend to extract plasticizers used in thermoplastic tubing, such as polyvinyl chloride. Solvents can severely swell thermoset elastomers, such as silicone rubber and natural rubber. Other chemicals result in chemical degradation of the polymeric tubing. As a result, the application of peristaltic pumps in numerous industries has been limited. Applications such as metering strong acids and bases, transferring solvent laden waste streams, transferring agrochemical compounds, dispensing printing inks, metering reactors with active pharmaceutical intermediates, and the recovery of hazardous materials have all been hampered without the availability of a chemical resistant tube and hose.

Fluoropolymers are known for their excellent chemical resistance. Fitter (U.S. Pat No. 3,875,970) described a polytetrafluoroethylene (PTFE) lined silicone rubber tube. Although not shown by example, the inventor claims that this combination should provide improved resistance to chemical attack. PTFE possesses excellent chemical resistance; however, it exhibits poor flexure endurance when it has not been stretched and expanded into a highly oriented structure as demonstrated by the instant invention.

Gore (U.S. Pat. No. 3,953,566) teaches a method of stretching and expanding PTFE to orient the polymer, thereby improving its mechanical properties. The “expanded” PTFE film results in a node and fibril morphology with a high degree of orientation. The porous PTFE is useful in many applications requiring breathability, strength, and flex endurance; however, it is not suitable for containing process fluids due to its porosity.

Knox (U.S. Pat. No. 5,374,473) describes the preparation of a full density expanded PTFE film for fluid handling applications such as pump diaphragms; however, the method of fabrication requires heating the expanded PTFE membranes to 368° C. for 55 min. in a high pressure autoclave (17 atm.) while evacuating the PTFE film encapsulated within a polyimide vacuum bag and breather cloth in order to render the film substantially non-porous. This process is not economically viable for the production of peristaltic pump tube liners due to the cost of the disposable vacuum bags and the operation of the autoclave.

Sunden (U.S. Pat. No. 5,482,447) taught the use of a rigid fluoroplastic tube contained within another rigid fluoroplastic tube such that the outside diameter of the inner tube was close to the inside diameter of the outer tube. The inside diameter of the inner tube was claimed to have a range of 0.5 to 18 mm. Commercially available tubes from Barnant Company are limited to 4 mm in inside diameter, thus restricting the range of achievable flow rates. Those skilled in the art recognize that larger bore to wall ratio tubes have difficulty restituting without the aid of an elastomeric covering due to the plastic deformation and creep inherent in thermoplastic fluoropolymers.

As a result, there is considerable need for a fluoroplastic lined elastomeric pump tube that has significant usable flex life to pump aggressive chemicals and does not suffer from the creep and lack of resilience observed in pure fluoroplastic tubes. There is also a need for much larger diameter fluoroplastic liners for peristaltic hose pumping. There is a further need for flexible elements for pinch valves. There is also a need for flex endurant elastomeric diaphragms.

SUMMARY OF THE INVENTION

An objective of this invention is to provide a chemical resistant pump tube that utilizes a fluoroplastic liner and an elastomeric covering. Preferred liners are comprised of expanded PTFE and a melt processable fluoroplastic, such as PFA, FEP, PVDF or THV. The expanded PTFE structure provides improved flexure endurance while the fluoroplastic provides a means to adhere the many layers of fluoropolymers that are used to fabricate the pump tube liner. Adhesion is accomplished by sintering the fluoropolymer liner at a temperature necessary to melt the fluoropolymers into a monolithic unit that resists delamination. Single or multiple ply fluoroplastic films can be used to prepare the liner. Pump tubing can be fabricated in sizes ranging from 0.5 mm to 100 mm in inside diameter. Integral fittings can be molded or welded onto the ends of the inventive tubing for hygienic and chemical fluid handling. Fittings can be prepared from polypropylene, PFA, and other thermoplastic polymers as well as silicone and other thermoset polymers.

Another objective of the invention is to provide a method to rapidly form a highly oriented tubular structure from a plurality of expanded PTFE and fluoroplastic films. A thin film (0.025 mm) of continuous length is wound around a mandrel so as to build up a thickness of between 0.05 mm and 1 mm. The wrapped mandrel is heat treated to simultaneously bond and consolidate the films into a monolythic tubular liner. Thus, a highly oriented tube can be fabricated from films that result in greater orientation than through traditional extrusion of such fluoropolymers.

A further objective of this invention is to provide a method that can be used to fabricate liners that are 100 mm in diameter and larger. Mandrels are tape wrapped in various ways with thin films to build orientation into the liner and build to a desired thickness and length for the application. In the case of liners for hose pumps, the liner thickness can approach 1 mm to provide sufficient strength and barrier properties for 100 mm bore hoses. Even larger diameter liners (>250 mm) can be fabricated for industrial pinch valves.

Another objective is to provide pump tubes that are covered with either unreinforced rubber or fiber reinforced rubber. Both coverings are necessary to accommodate the wide range of processing conditions that are encountered with peristaltic pumping. The composite of the instant invention can utilize various elastomeric layer materials comprises natural rubber, silicone, urethane, polyethylene, olefinic elastomer, chloroprene, ethylene-propylene-diene monomer elastomer (EPDM), blends of EPDM and polypropylene (PP), blends of styrinic-ethylene-butylene block copolymer with PP, fluoroelastomer (FKM), perfluoroelastomer (FFKM), perfluoropolyether elastomer, nitrile rubber, or combinations thereof.

One additional objective of this invention is to demonstrate that either thermoset or thermoplastic covering materials can be rapidly bonded to the etched fluoroplastic liners. Utilizing previously extruded tubing as the covering by bonding them onto the liner with a tie-layer helps reduce the cost of fabrication.

Another objective of this invention is to provide flex endurant composites for fluid handling and sealing including gaskets, diaphragms, expansion joints, and transfer hoses.

DETAILED DESCRIPTION OF THE INVENTION

Figure 1:
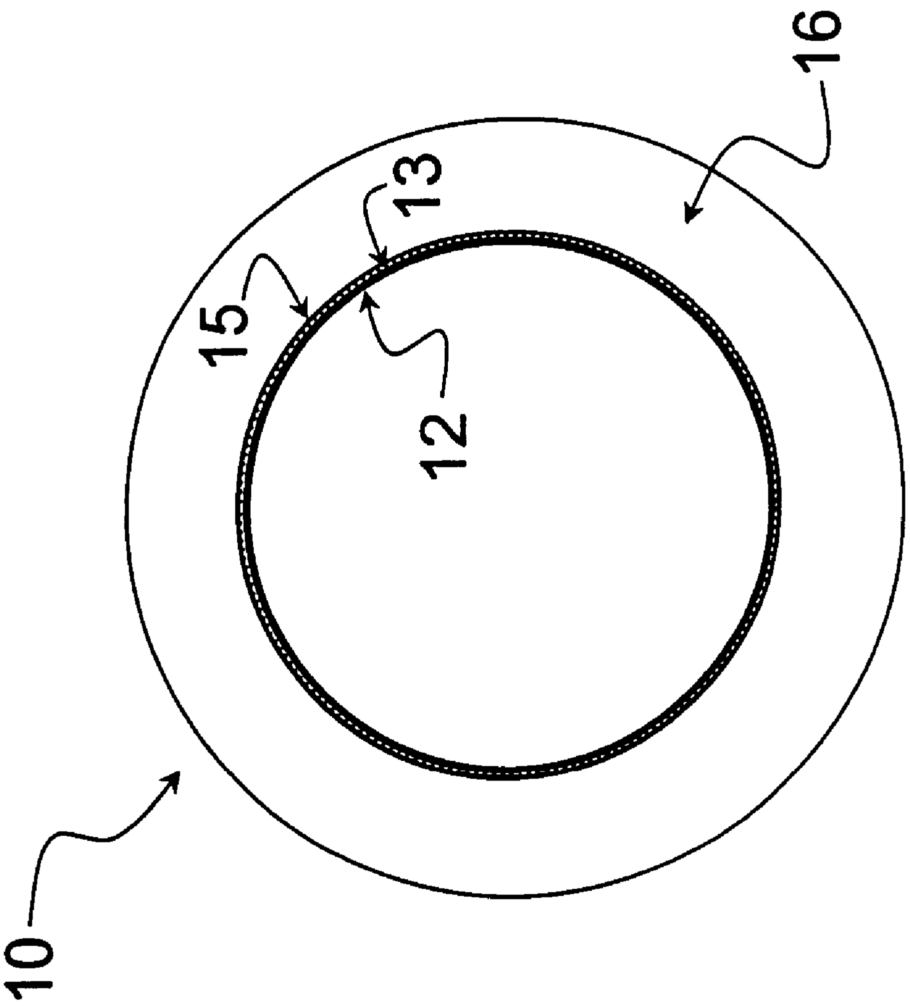
FIG. 1. Cross-sectional view of fluoroplastic lined elastomeric pump tube.

The present invention relates to improved pump tubes and to methods for making improved tubes. The improved pump tube 10 shown in cross-section in FIG. 1 comprises a thin fluoroplastic liner 12 bonded to a thick, resilient elastomeric covering 16 with an adhesive layer 15. The adhesive layer is bonded to the inventive liner by way of a sodium ammonia or similar etched surface 13 and optional primer on top of the etched surface. The resulting lined pump tube has the chemical resistance of a fluoroplastic and the resilience of an elastomer.

Figure 2:
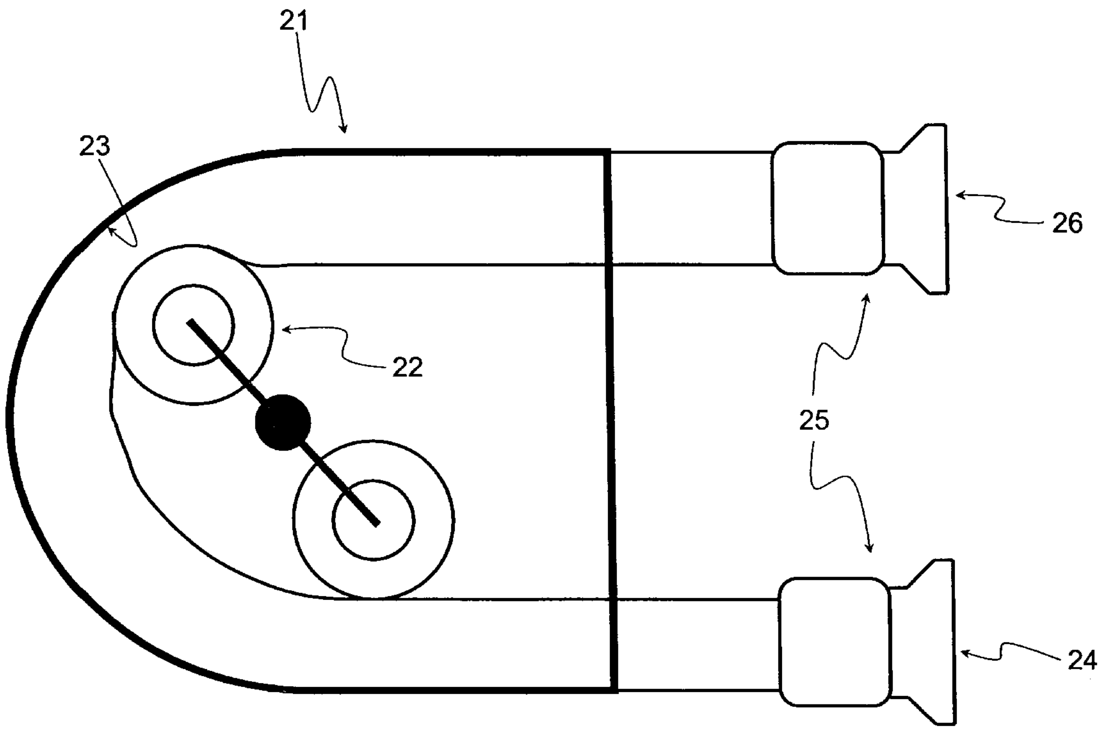
FIG. 2. Diagram of a rotary peristaltic tubing pump.

The tubing of the instant invention is incorporated into a peristaltic pump shown in FIG. 2. The tubing is secured in the pumphead 21 with clamps 25 on either side of the pumphead to prevent slippage through the pump cavity. Rollers 22 located on the rotor are driven at a specified rate so as to compress the tubing repeatedly, thus propelling the fluid inside the tubing from the inlet side 24 to the outlet side 26 of the pump when turning in the clockwise direction. The distance between the roller 22 and the track 23 is carefully controlled to maximize the life of the tubing and still maintain positive displacement of the process fluid, even under significant backpressure. The track is generally arced or U-shaped to promote proper peristalsis of the process fluid by the moving rotor.

It has been surprising discovered that the flex endurance of the inventive tube is much better than tubes made from the individual fluoroplastics by themselves. Tubes prepared with only expanded PTFE are porous and thus not practical for pumping chemicals. Pure fluoroplastic pump tubes exhibit very short flex life as shown in the examples below. The combination of expanded PTFE and a melt processable fluoroplastic results in improved barrier properties and flexure endurance, most likely as a result of the reinforcing PTFE node and fibril structure.

Figure 3:
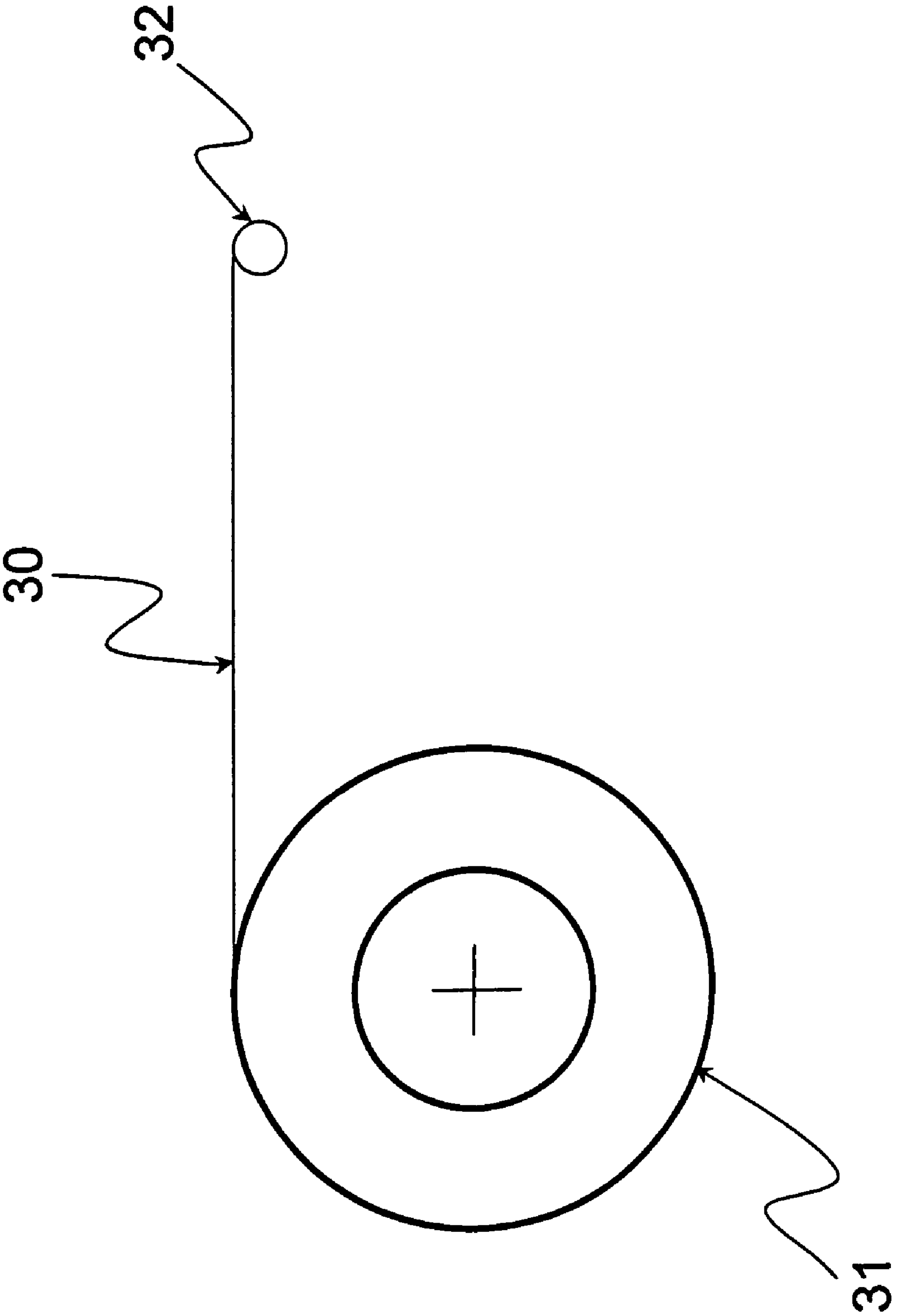
FIG. 3. Schematic diagram shows the circumferential wrapping of mandrel with film.

A preferred method of making the fluoroplastic liner comprises the steps of:

(a) wrapping a plurality of expanded PTFE and fluoroplastic layers onto a mandrel (b) heating the layers to affect bonding to one another to produce a liner (c) etching the exterior of the liner to affect bonding of an elastomeric cover (d) bonding an elastomeric cover to the treated liner As shown in FIG. 3, the film 30 may be spooled off a supply roll 31 and wound around the mandrel 32 in a circumferential direction to build the required thickness of the liner 12. Alternatively, the film may be wound at an angle to the mandrel so as to optimize the orientation of the fibrils with respect to the liner. Narrow tapes could be used to fabricate the inventive composite.

EXAMPLES

Example 1

25×4.8 mm Tube

A film of expanded PTFE-PFA was obtained from W. L. Gore & Associates, Inc. (Newark, Del.) as designated by the part number (5815060). The film had a density of 2.185 g/ml and a thickness of 0.020 mm. The 56 cm wide film was wrapped 13 times around a cylindrical metal mandrel having an OD of 25.4 mm and was heated for 60 min at 371° C. The resultant monolythic tube liner was removed from the mandrel and etched with a sodium ammonia solution. The resultant etched tube was placed back onto a metal mandrel and wrapped with a 0.2 mm thick adhesive tie-layer from Advanced Elastomers (8291-65TB) and was heated at 125° C. for 15 minutes. Next, the cooled liner was covered with a length of extruded Santoprene™ tubing obtained from Watson-Marlow Bredel (part number 903.0254.048). The article was wrapped with a nylon cure wrap to compress the composite and eliminate air entrapment. The mandrel was heated to a temperature of 175° C. for a period of 60 minutes to bond the etched liner to the interior of the Santoprene™ tubing. The heat treated tube was ground on a cylindrical grinder to obtain a wall thickness of 4.8 mm. The resultant tube had a fluoroplastic liner of 0.25 mm and an elastomeric covering of 4.6 mm.

The inventive tube was mounted in a Watson-Marlow, Ltd. Pump (model 704U) and used to recirculate water for 625 hours at 360 rpm until the liner cracked by flex fatigue. The total number of compressions to failure was 54 million. The flow rate over time demonstrated excellent retention of the restitution capability of the thick rubber and flexibility of the thin fluoroplastic liner.

A 19 mm inside diameter inventive tube was also fabricated. The adhesive covered liner was covered with a length of extruded Santoprene™ tube obtained from Watson-Marlow Bredel (part number 903.0190.048). The article was wrapped with a nylon cure wrap to compress the composite and eliminate air entrapment. The mandrel was heated to a temperature of 175° C. for a period of 60 minutes to bond the etched liner to the interior of the Santoprene(™) tubing. The heat treated tube was ground on a cylindrical grinder to obtain a wall thickness of 4.8 mm. The resultant tube had a fluoroplastic liner of 0.25 mm and an elastomeric covering of 4.6 mm.

The 19 mm inventive tube was mounted in a Watson-Marlow, Ltd. Pump (model 704U) and used to recirculate water for 752 hours at 360 rpm until the liner cracked by flex fatigue. The total number of compressions to failure was 65 million. The flow rate over time demonstrated excellent retention of the restitution capability of the thick rubber and flexibility of the thin fluoroplastic liner.

A 6.4 mm inside diameter inventive tube was also fabricated. The liner was prepared from 6 layers of film to improve flexibility. The adhesive covered liner was covered with a length of extruded Santoprene™ tube obtained from Watson-Marlow Bredel (part number 903.0064.032). The article was wrapped with a nylon cure wrap to compress the composite and eliminate air entrapment. The mandrel was heated to a temperature of 175° C. for a period of 60 minutes to bond the etched liner to the interior of the Santoprene™ tubing. The heat treated tube was ground on a cylindrical grinder to obtain a wall thickness of 3.2 mm. The resultant tube had a fluoroplastic liner of 0.12 mm and an elastomeric covering of 3.1 mm.

The 6.4 mm inventive tube was mounted in a Ismatec SA Pump (model FMT 300) and used to recirculate water for 336 hours at 500 rpm until the liner cracked by flex fatigue. The total number of compressions to failure was 30 million. The flow rate over time demonstrated excellent retention of the restitution capability of the thick rubber and flexibility of the thin fluoroplastic liner.

Comparative Example A

FEP Tube

A tube of pure fluoroplastic (FEP-fluorinated ethylene propylene) was obtained from McMaster-Carr Supply Company (Dayton, N.J.) (part number 8703K171) having a length of 575 mm, an inside diameter of 27 mm and a wall thickness of 0.5 mm. The FEP tube was etched using the same method used in example 1. The etched tube was placed onto a 25.4 mm mandrel and shrunk onto the mandrel with a heat gun. The liner was next wrapped with a 0.2 mm thick adhesive tie-layer from Advanced Elastomers (8291-65TB) and was heated at 125° C. for 15 minutes. Next, the cooled liner was covered with a length of extruded Santoprene™ tube obtained from Watson-Marlow Bredel (part number 903.0254.048). The article was wrapped with a nylon cure wrap to compress the composite and eliminate air entrapment. The mandrel was heated to a temperature of 175° C. for a period of 60 minutes to bond the etched liner to the interior of the Santoprene(™) tubing. The heat treated tube was ground on a cylindrical grinder to obtain a wall thickness of 4.8 mm. The resultant tube had a fluoroplastic liner of 0.5 mm and an elastomeric covering of 4.3 mm.

The comparative tube was mounted in a Watson-Marlow, Ltd. Pump (model 704U) and used to recirculate water for 2 hours at 250 rpm until the liner cracked by flex fatigue. The total number of compressions to failure was 0.25 million. The flow rate was stable over the two hours and the liner was thin enough to allow the rubber to restitute.

Comparative Example B

PTFE Tube

A tube of pure PTFE was obtained from McMaster-Carr Supply Company (part number 75665K83) having an inside diameter of 25.4 mm and a wall thickness of 0.3 mm. The PTFE tube was etched using the same method used in example 1. The etched tube was placed onto a 25.4 mm mandrel and bonded to the same elastomer described above.

The comparative tube was mounted in a Watson-Marlow Ltd. Pump (model 704U); however, the motor was stalled by the excessively stiff tube. Thus, the tube was not able to be life tested.

Example 2

6.4 mm Tube with Water vs. Solvent

A film of expanded PTFE-PFA was obtained from W. L. Gore & Associates, Inc. (Newark, Del,) as designated by the part number (5815060). The film had a density of 2.185 g/ml and a thickness of 0.020 mm. The 56 cm wide film was wrapped 6 times around a cylindrical metal mandrel having an OD of 6.4 mm and was heated for 70 min at 366° C. The resultant monolythic tube liner was removed from the mandrel and etched with a sodium ammonia solution. The resultant etched tube was placed back onto a metal mandrel and wrapped with a 0.2 mm thick adhesive tie-layer from Advanced Elastomers (8291-65TB) and was heated at 125° C. for 15 minutes. Next, the cooled liner was covered with a length of extruded Santoprene(™) tube obtained from Watson-Marlow Bredel (part number 903.0064.032). The article was wrapped with a nylon cure wrap to compress the composite and eliminate air entrapment. The mandrel was heated to a temperature of 175° C. for a period of 60 minutes to bond the etched liner to the interior of the Santoprene(™) tubing. The heat treated tube was ground on a cylindrical grinder to obtain a wall thickness of 2.4 mm. The resultant tube had a fluoroplastic liner of 0.12 mm and an elastomeric covering of 2.28 mm.

The inventive tube was mounted in a Barnant Company (model L/S; part number 07518-12) and used to recirculate water for 241 hours at 575 rpm until the liner cracked by flex fatigue. The total number of compressions to failure was 25 million. The flow rate over time demonstrated excellent retention of the restitution capability of the rubber exterior and flexibility of the thin fluoroplastic liner.

The inventive tube of example 2 was tested using kerosene as the process fluid. The tube was mounted in a Barnant Company (model L/S; part number 07518-12) and used to recirculate kerosene for 250 hours at 575 rpm until the liner cracked by flex fatigue. The total number of compressions to failure was 26 million. The flow rate loss over the life of the tube was negligible showing excellent retention of flow rate while pumping an aggressive solvent.

The inventive tube of example 2 was also mounted in a Watson-Marlow Ltd. pump (model 313T) and used to recirculate water for 408 hours at 400 rpm until the liner cracked by flex fatigue. The total number of compressions to failure was 29 million. The flow rate over time demonstrated excellent retention of the restitution capability of the rubber exterior and flexibility of the thin fluoroplastic liner.

The inventive tube of example 2 was tested using kerosene as the process fluid. The tube was mounted in a Watson-Marlow Ltd. pump (model 313T) and used to recirculate kerosene for 432 hours at 400 rpm until the liner cracked by flex fatigue. The total number of compressions to failure was 31 million. The flow rate loss over the life of the tube was negligible showing excellent retention of flow rate while pumping an aggressive solvent.

Example 3

19×4.8 mm Silicone & Natural Rubber Covers

A film of expanded PTFE-PFA was obtained from W. L. Gore & Associates, Inc. (Newark, Del.) as designated by the part number (5815060). The film had a density of 2.185 g/ml and a thickness of 0.020 mm. The 56 cm wide film was wrapped 13 times around a cylindrical metal mandrel having an OD of 19 mm and was heated for 60 min at 371° C. The resultant monolythic tube liner was removed from the mandrel and etched with a sodium ammonia solution. The resultant etched tube was placed back onto a metal mandrel and brush coated with a platinum silicone liquid adhesive from Dow Corning (DC 577). Next, the liner was covered with a length of platinum silicone tubing obtained from Watson-Marlow Bredel (part number 913.0190.048). The article was wrapped with a nylon cure wrap to compress the composite and eliminate air entrapment. The mandrel was heated to a temperature of 175° C. for a period of 45 minutes to bond the etched liner to the interior of the silicone tubing. The tubing was next post baked in a convection oven at 198° C. for two hours. The heat treated tube was ground on a cylindrical grinder to obtain a wall thickness of 4.8 mm. The resultant tube had a fluoroplastic liner of 0.25 mm and an elastomeric covering of 4.6 mm.

The inventive tube was mounted in a Watson-Marlow, Ltd. Pump (model 704U) and used to recirculate water for 200 hours at 125 rpm until the silicone cover delaminated and cracked by flex fatigue. The inventive liner was not damaged. The total number of compressions to failure was 6 million. The flow rate over time demonstrated excellent retention of the restitution capability of the thick rubber and flexibility of the thin fluoroplastic liner.

Another liner was prepared to demonstrate the use of a natural rubber covering. A film of expanded PTFE-PFA was obtained from W. L. Gore & Associates, Inc. (Newark, Del.) as designated by the part number (5815060). The film had a density of 2.185 g/ml and a thickness of 0.020 mm. The 56 cm wide film was wrapped 13 times around a cylindrical metal mandrel having an OD of 19 mm and was heated for 60 min at 371° C. The resultant monolythic tube liner was removed from the mandrel and etched with a sodium ammonia solution. The resultant etched tube was placed back onto a metal mandrel and brush coated with a primer from Lord Corporation (Erie, Pa.) with part number ChemLok 250. Next, the liner was covered with a piece of calendered natural rubber obtained from the Bata Shoe Company (Baltimore, Md.). The article was wrapped with a nylon cure wrap to compress the composite and eliminate air entrapment. The mandrel was heated to a temperature of 150° C. for a period of 60 minutes to bond the etched liner to the natural rubber. The tube was ground on a cylindrical grinder to obtain a wall thickness of 4.8 mm. The resultant tube had a fluoroplastic liner of 0.25 mm and an elastomeric covering of 4.6 mm.

The inventive tube was mounted in a Watson-Marlow, Ltd. Pump (model 704U) and used to recirculate water for 433 hours at 125 rpm until the natural rubber cover deteriorated and cracked by flex fatigue and abrasion. The inventive liner was not damaged. The total number of compressions to failure was 13 million.

Example 4

100 mm Liner

A film of expanded PTFE-PFA was obtained from W. L. Gore & Associates, Inc. (Newark, Del.) as designated by the part number (5815060). The film had a density of 2.185 g/ml and a thickness of 0.020 mm. The 25 cm wide film was wrapped 15 times around a cylindrical metal mandrel having an OD of 100 mm and was heated for 30 min at 371° C. The resultant monolythic tube liner was removed from the mandrel.

Example 5

38 mm Transfer Hose

Another liner was prepared to demonstrate the fabrication of a flexible hose. A film of expanded PTFE-PFA was obtained from W. L. Gore & Associates, Inc. (Newark, Del.) as designated by the part number (5815060). The film had a density of 2.185 g/ml and a thickness of 0.020 mm. The 159 cm wide film was wrapped 13 times around a cylindrical metal mandrel having an OD of 38 mm and was heated for 90 min at 371° C. The resultant monolythic tube liner was removed from the mandrel and etched with a sodium ammonia solution. The resultant etched tube was placed back onto a metal mandrel and brush coated with a primer from Lord Corporation (Erie, Pa.) with part number ChemLok 250. Next, the liner was covered with a piece of calendered ethylene propylene diene monomer (EPDM) rubber obtained from Graphic Arts Inc. (Cuyahoga Falls, Ohio). The article was wrapped with a nylon cure wrap to compress the composite and eliminate air entrapment. The mandrel was heated to a temperature of 150° C. for a period of 60 minutes to bond the etched liner to the EPDM rubber. The tube was ground on a cylindrical grinder to obtain a wall thickness of 12.5 mm. The resultant tube had a fluoroplastic liner of 0.25 mm and an elastomeric covering of 12.2 mm. The tube was further processed with a profiled grinding wheel to produce 5 mm deep grooves 10 mm apart to produce a convoluted outside diameter. The resultant transfer hose was flexible and resisted kinking.

Example 6

6.4 mm Pinch Tube

The tube of example 2 was placed into a pinch valve body obtained from McMaster-Carr Supply Company (Dayton, N.J.) (Part number: 53345K35). The valve was adjusted to completely restrict the flow of xylene through the tubing. The valve was allowed to rest in the closed position with the xylene inside for one week and was then opened to allow the solvent to flow through the tubing unobstructed. The tubing was unaffected by the solvent.

Example 7

Sheets

Another liner was prepared to demonstrate the preparation of articles from sheet goods. A film of expanded PTFE-PFA was obtained from W. L. Gore & Associates, Inc. (Newark, Del.) as designated by the part number (5815060). The film had a density of 2.185 g/ml and a thickness of 0.020 mm. An 89 cm wide film was wrapped 19 times around a cylindrical metal mandrel having an OD of 50 mm and was heated for 90 min at 371° C. The resultant monolythic tube liner was removed from the mandrel, slit along the longitudinal axis to form a flat sheet, and etched with a sodium ammonia solution. The resultant etched sheet was cut into two 15 cm ×15 cm pieces and brush coated with ChemLok™ 250 primer from Lord Corporation (Erie, Pa.). Next, a stack consisting of two pieces of 1.6 mm calendered natural rubber were placed between two pieces of etched and primed inventive sheets, and compression molded at 160° C. for 55 min. in a flat plaque mold to obtain test specimens for peel testing. The vulcanized samples were cut into 25 mm wide strips and pulled in a tensile testing machine. Failure was completely cohesive in nature for all samples, thus indicating excellent adhesion to the inventive sheets. Complicated three dimensional parts, such as pump diaphragms, can be molded in likewise fashion from flat sheets.

The invention claimed is:

1. A peristaltic pump and a flex endurant tube wherein the peristaltic pump compresses the flex endurant tube to effectuate pumping, the flex endurant tube comprising:
   - an elastomeric covering and a fluoroplastic liner adhesively bonded to the elastomeric covering, the fluoroplastic liner comprising a plurality of alternating expanded PTFE film layers and other fluoroplastic film layers;
   - wherein the liner is rendered monolithic by heating the alternating layers to adhere the layers together; and
   - wherein the flex endurant tube is capable of withstanding from 6 to 65 million peristaltic pump compressions.

2. The peristaltic pump and flex endurant tube of claim 1 wherein the thickness of said elastomeric covering is between 1.05 mm and 12.2 mm and the thickness of the fluoroplastic liner is between 0.05 mm and 1.0 mm.

3. The peristaltic pump and flex endurant tube of claim 1 wherein said fluoroplastic liner comprises no fewer than about 2 layers of expanded PTFE film and no fewer than about 2 layers of other fluoroplastic film and not more than about 50 layers of expanded PTFE film and not more than about 50 layers of other fluoroplastic film.

4. The peristaltic pump and flex endurant tube of claim 1 wherein the other fluoroplastic films are selected from the group consisting of PTFE, PFA, FEP, PVDF and THV.

5. The peristaltic pump and flex endurant tube of claim 1 wherein the fluoroplastic liner further comprises an electrically conductive or semi-conductive filler.

6. The peristaltic pump and flex endurant tube of claim 1 wherein said elastomeric covering is selected from the group consisting of natural rubber, silicone, urethane, polyethylene, chloroprene, EPDM, blends of EPDM and PP, FKM, FFKM, perfluoropolyether elastomer, nitrile rubber, and combinations thereof.

7. The peristaltic pump and flex endurant tube of claim 1 wherein the inner diameter of the tube is not less than about 0.5 mm and not more than about 100 mm.

8. The peristaltic pump and flex endurant tube of claim 1 with PFA fittings attached onto the ends of the tube.

9. The peristaltic pump and flex endurant tube of claim 1 with polypropylene fittings attached onto the ends of the tube.

10. The peristaltic pump and flex endurant tube of claim 1 wherein the plurality of PTFE and other fluoroplastic film layers are wound around a mandrel in a circumferential direction.

11. The peristaltic pump and flex endurant tube of claim 1 wherein the plurality of PTFE and other fluoroplastic film layers are wound around a mandrel at an angle.

12. A peristaltic pump and an elastically and repeatedly collapsible tube wherein the peristaltic pump compresses the tube, the tube comprising:
    - an elastomeric covering and a fluoroplastic liner adhesively bonded to the elastomeric covering, the fluoroplastic liner comprising a plurality of alternating expanded PTFE film layers and other fluoroplastic film layers;
    - wherein the liner is rendered monolithic by heating the alternating layers to adhere the layers together; and
    - wherein the expanded PTFE and associated other fluoroplastic film layer has a density of 2.185 g/ml.

13. The peristaltic pump and elastically and repeatedly collapsible tube of claim 12 wherein the tube is capable of withstanding from 6 to 65 million peristaltic pump compressions.

* * * * *